United States Patent [19]

Hirano et al.

[11] Patent Number: 4,494,942
[45] Date of Patent: Jan. 22, 1985

[54] CONTINUOUSLY VARIABLE V-BELT TRANSMISSION

[75] Inventors: Hiroyuki Hirano, Yokosuka; Sigeaki Yamamuro, Zushi; Yoshiro Morimoto, Yokosuka; Yoshikazu Tanaka, Yokohama, all of Japan

[73] Assignee: Nissan Motor Co., Ltd., Yokohama, Japan

[21] Appl. No.: 367,090

[22] Filed: Apr. 9, 1982

[30] Foreign Application Priority Data

Apr. 11, 1981 [JP] Japan .................................. 56-53793

[51] Int. Cl.³ ............................................. F16H 11/04
[52] U.S. Cl. .................................. 474/28; 192/106 F; 474/18
[58] Field of Search ........................ 474/13, 16, 18, 28; 74/467, 689; 192/106 F

[56] References Cited

U.S. PATENT DOCUMENTS

| 2,939,558 | 6/1960 | Schjolin | 192/106 F X |
| 3,099,166 | 7/1963 | Schou | 192/106 F |
| 3,295,646 | 1/1967 | Peterson | 192/106 F |
| 3,600,960 | 8/1971 | Karig et al. | 474/12 |
| 3,600,961 | 8/1971 | Rattunde et al. | 474/28 |
| 3,782,213 | 1/1974 | Rattunde | 474/28 |
| 4,023,425 | 5/1977 | Parker | 474/16 |
| 4,143,558 | 3/1979 | van Deursen et al. | 474/28 |
| 4,229,988 | 10/1980 | Rattunde | 474/28 |
| 4,369,675 | 1/1983 | van Deursen | 74/864 |

FOREIGN PATENT DOCUMENTS 1194148 6/1970 United Kingdom .
2033502 5/1980 United Kingdom .

Primary Examiner—George H. Krizmanich
Assistant Examiner—Dwight G. Diehl
Attorney, Agent, or Firm—Schwartz, Jeffery, Schwaab, Mack, Blumenthal & Koch

[57] ABSTRACT

A continuously variable V-belt transmission comprises a V-belt running over drive and driven pulleys, each having an axially fixed conical disc, axially movable conical disc and a cylinder chamber for moving the axially movable conical disc. At least one of the pulleys has a compensation chamber which is separated from the cylinder chamber by a partition wall member. The compensation chamber is enclosed by the partition wall member, cylinder wall and trough including an annular disc like portion directed inwardly of the cylinder wall. The trough has a tubular portion directed axially from the disc like portion. A passage is formed and is so directed that flow of fluid from an outlet port of a torque converter is guided by the tubular portion toward the compensation chamber.

4 Claims, 4 Drawing Figures

CONTINUOUSLY VARIABLE V-BELT TRANSMISSION

BACKGROUND OF THE INVENTION

1. Field of the Invention

The present invention relates to a continuously variable V-belt transmission, and more particularly to a centrifugal force compensation apparatus designed to offset the oil pressure occurring within the pulley cylinder chamber due to the centrifugal force.

2. Description of the Prior Art

There is known as a centrifugal force compensation apparatus of a continuously variable V-belt transmission, an apparatus as disclosed in U.S. Pat. No. 4,143,558, which apparatus is shown in FIG. 1. Arranged in a face-to-face relationship with an axially fixed conical disc 202 integral with a shaft 201 is an axially movable conical disc 203 mounted slidably along the shaft 201. The fixed and movable conical discs 202 and 203 define a V-shaped pulley groove in which a V-belt 204 is disposed. Within a cylinder wall 203a integral with the movable conical disc 203, a partition wall member 205 is disposed which is fixedly connected to the shaft 201 and defines a pulley cylinder chamber 206 on one side and a compensation chamber 207 on the opposite side. The cylinder chamber 206 is enclosed by the conical disc 203, cylinder wall 203a and partition wall member 205. The compensation chamber 207 is enclosed by the cylinder wall 203a, partition wall member 205 and a washer 203b fixedly attached to open end of the cylinder wall 203a. The cylinder chamber 206 and pressure compensation chamber 207 communicate with each other by an orifice 208a formed through a control member 208 slidably extending through the partition wall member 205. In the illustrated position wherein the oil pressure within the pulley cylinder chmaber 206 is low, the pulley cylinder chamber 206 is permitted to communicate with the compensation chamber 207 to supply oil to the compensation chamber 207, while, in the position illustrated by the borken lines wherein the oil pressure within the pulley cylinder chamber 206 is high, the orifice 208a is closed by the partition wall member 205. Therefore, in the case wherein the oil pressure within the pulley cylinder chamber 206 is low and the movable conical disc 203 rotates at a high speed, oil is allowed to flow into the compensation chamber 207 through the orifice 208a, so that, since the oil exists within the compensation chamber 207 as well as within the pulley cylinder chamber 206 to create substantially the same, in magnitude, oil pressure due to centrifugal forces, the oil pressures due to these centrifugal forces are offset, allowing the movable conical disc 206 to move accurately in response to the oil pressure supplied to the pulley cylinder chamber 206 even under a condition wherein the movable conical disc 206 rotates at a high speed. On the other hand, when the oil pressure within the pulley cylinder chamber 206 is high, the orifice 208a is closed to prevent the supply of oil to the compensation chamber 207, thus preventing a drop in oil pressure within the pulley cylinder chamber 206.

However, in a continuously variable transmission such centrifugal force compensation apparatus, there is a problem that since the oil pressure within the pulley cylinder chamber is released via an orifice, the pressure drops or becomes unstable owing to the variation in the volume of relief of the oil pressure. Another problem is that because there occurrs no supply of oil to the compensation chamber, the centrifugal force compensation function ceases when the oil pressure in the pulley cylinder chamber is high enough to close the orifice.

SUMMARY OF THE INVENTION

According to the present invention, the above mentioned problems have been solved by separating a compensation chamber from a cylinder chamber of a pulley. Thus, the flow of fluid from the cylinder chamber to the compensation chamber does not take place any more. The supply of fluid to the compensation chamber is effected from another source of fluid via another route.

An object of the present invention is to provide a continuously variable V-belt transmission wherein there is no supply of fluid from a cylinder chamber to a compensation chamber.

BRIEF DESCRIPTION OF THE DRAWINGS

The present invention is more specifically described hereinafter in connection with the accompanying drawings, wherein.

DESCRIPTION OF THE EMBODIMENT

Figure 1:
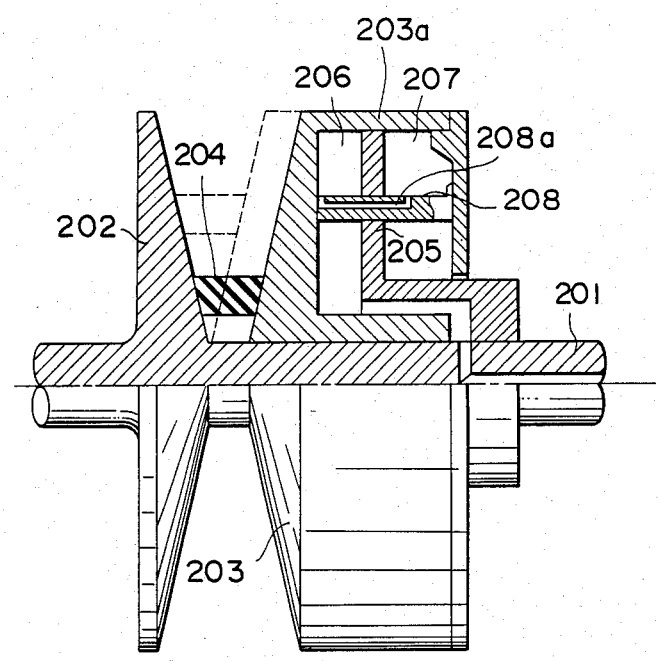
FIG. 1 diagrammatically shows the conventional continuously variable V-belt transmission.
Figure 2:
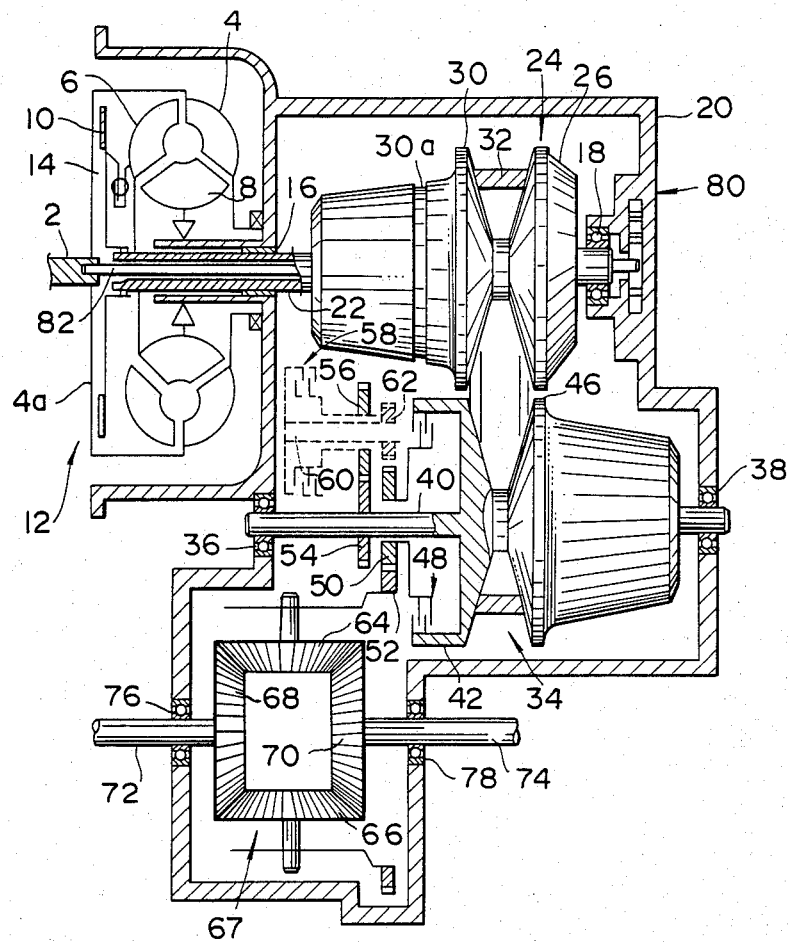
FIG. 2 is a diagrammatic view illustrating a power transmission mechanism of a continuously variable transmission.
Figure 3:
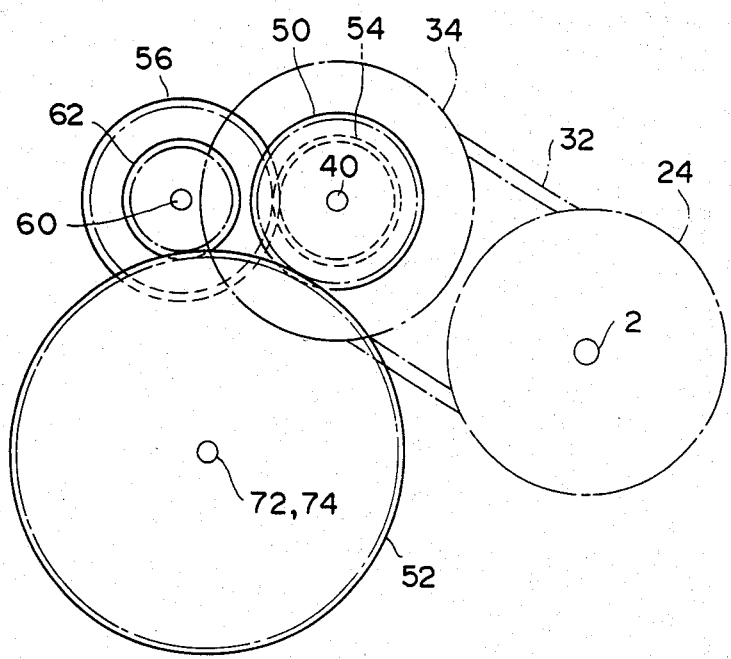
FIG. 3 is a layout of the shafts used in the continuously variable transmission shown in FIG. 2.
Figure 4:
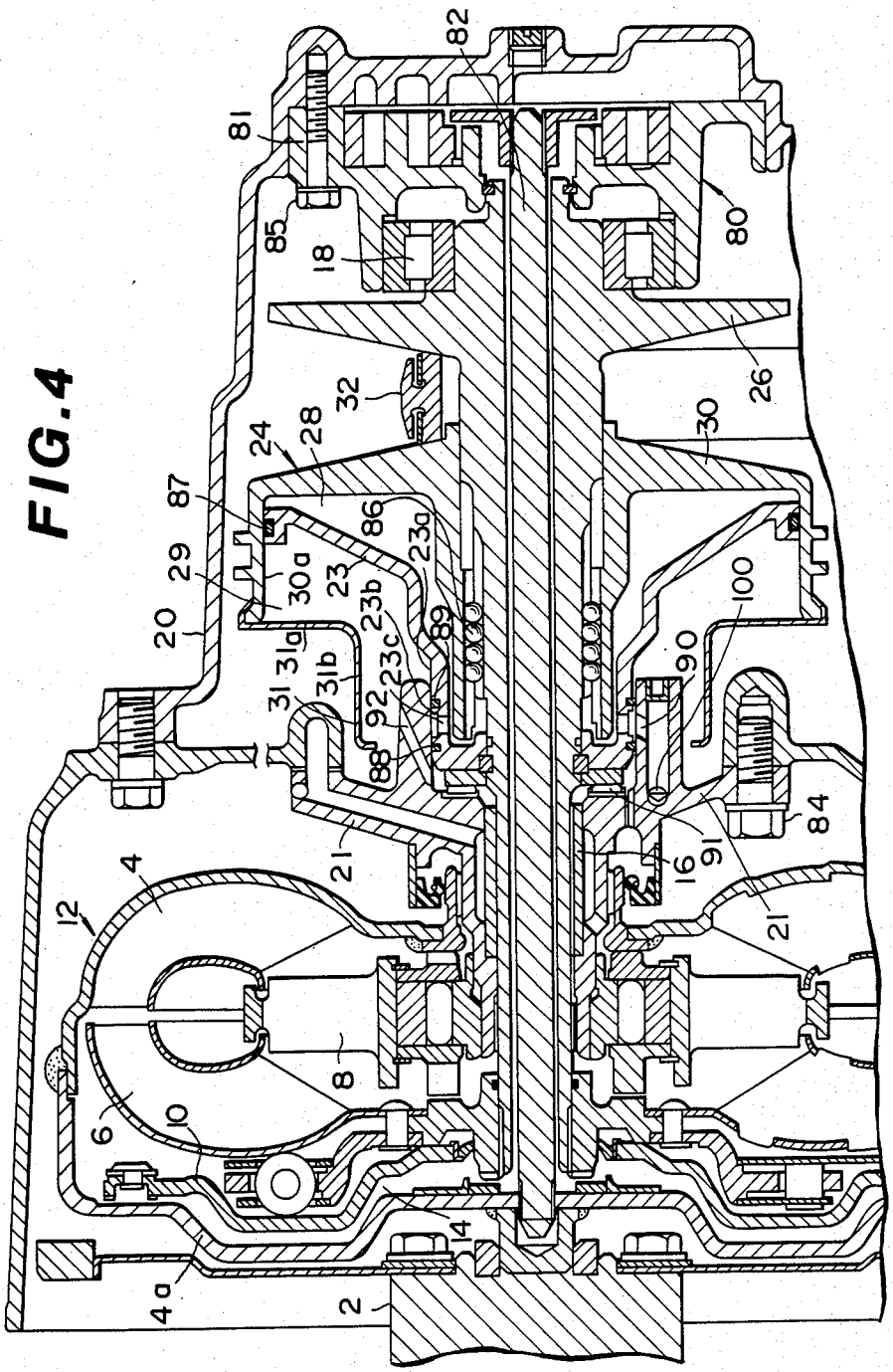
FIG. 4 is a cross section of the continuously variable V-belt transmission embodying the present invention.

Referring to FIGS. 2 through 4, an embodiment according to the present invention is described.

Firstly, an explanation is made as to the construction and operation of a continuously variable V-belt transmission referring to FIGS. 2 and 3, followed by an explanation of the detailed construction shown in FIG. 4.

As shown in FIG. 2, an engine output shaft 2 in rotary unison with a crankshaft (not illustrated) has mounted thereon a hydrodynamic transmission unit in the form of a torque converter 12 which includes a pump impeller 4, a turbine runner 6, a stator 8 and a lock-up clutch 10. The lock-up clutch 10 is coupled with a turbine runner 6 and is axially slidable, the lock-up clutch 10 cooperating with a converter shell 4a coupled with the engine output shaft 2 integral with the pump impeller 4 to form a lock-up clutch oil chamber 14. In operation, when the oil pressure in the lock-up clutch oil chamber drops below the level of the oil pressure in the torque converter 12, this pressure difference presses the lock-up clutch 10 against the member 4a for unitary rotation with same. The turbine runner 6 is splined to one end portion of a drive shaft 22 rotatably supported by a case 20 via bearings 16 and 18.

A drive pulley 24 is mounted on the drive shaft 22 between the bearings 16 and 18. The drive pulley 24 comprises an axially fixed conical disc 26 fixedly secured to the drive shaft 22 and an axially movable conical disc 30 which is arranged in a face-to-face relationship with the fixed conical disc 26 to define a V-shaped pulley groove and which is axially movable along the drive shaft 22 by the oil pressure acting within the drive pulley cylinder chamber 28 (see FIG. 4). The drive pulley 24 is drivingly connected to a driven pulley 34 by a V-belt 32. The driven pulley 34 is mounted on a driven shaft 40 rotatably supported by the case 20 by means of bearings 36 and 38. The driven pulley 34 comprises an axially fixed conical disc 42 fixedly secured to the driven shaft 40 and an axially movable conical disc 46 which is arranged in a face-to-face relationship with the fixed conical disc 42 to definne a V-shaped pulley groove and which is axially slidable along the driven shaft 40 by the oil pressure acting within the driven pulley cylinder chamber 28.

A forward drive gear 50 which is rotatably supported by the driven shaft 40 is engageable with the fixed conical disc 42 via a forward multiple disc clutch 48, the forward drive gear 50 meshing with a ring gear 52. Fixed to the driven shaft 40 is a reverse drive gear 54 which meshes with an idle gear 56. The idel gear 56 is engageable with an idle shaft 60 via a reverse multiple disc clutch 58, the idle shaft 60 having fixed thereto another idle gear 62 which meshes with the ring gear 52. (It is to be understood that in the case of FIG. 2 for ease of illustration the idle gear 62, idle shaft 60 and reverse multiple disc clutch 54 are illustrated as displaced from their proper positions so that the idle gear 62 appears to be out of mesh with ring gear 52, but they actually mesh with each other as shown in FIG. 3.) Connected to the ring gear 52 for rotation therewith are a pair of pinion gears 64 and 66. A pair of side gears 68 and 70 mesh with this pair of pinion gears 64 and 66 to form a differential 67 and are coupled with the output shafts 72 and 74, respectively. The output shafts 72 and 74 rotatably supported by bearings 76 and 78, respectively, extend in the opposite directions outwardly of the case 20. These output shafts 72 and 74 are supposedly coupled with road wheels, unillustrated. To the right of the bearing 18 an internally meshing gear type oil pump 80 serving as a source of oil pressure for a hydraulic control system, the oil pump 80 being driven by the engine output shaft 2 through an oil pump drive shaft 82 extending through the hollow drive shaft 22.

Rotation force is fed from the engine output shaft 2 to the continuously variable V-belt transmission including the torque converter 12 with lock-up clutch 10, continuously variable V-belt transmission unit and differential 67. It is delivered firstly to the torque converter 12, drive shaft 22, drive pulley 24, V-belt 32, driven pulley 34, driven shaft 40 in this sequence, and further to the forward drive gear 50, ring gear 52, diferential 67 and then to the output shafts 72 and 74 to rotate them in the forward direction when the forward multiple disc clutch 48 is engaged with the reverse multiple disc clutch 58 released. The rotation force is delivered further to the reverse drive gear 54, idle gear 56, idle shaft 60, idle gear 62, ring gear 52, differential 67 and the output shafts 72 and 74 to rotate them in the reverse direction when the reverse multiple disc clutch 58 is engaged with the forward multiple disc clutch 48 released. During this transmission of force a rotational ratio between the drive pulley 24 and driven pulley 34 can be varied by axially displacing the movable conical disc 30 of the drive pulley 24 and the movable conical disc 46 of the driven pulley 34 in a manner to vary the running diameter of the V-belt 34. For example, if the width of the V-shaped pulley groove of the drive pulley 24 is increased and at the same time the width of the V-shaped pulley groove of the driven pulley 34 is reduced, the radius of the running diameter of the V-belt 32 on the drive pulley 24 reduces and the radius of the running diameter of the V-belt 32 on the driven pulley 34 increases, thus providing a high reduction ratio (a great reduction ratio). If the movable conical discs 30 and 46 are displaced in the reverse directions, the reduction ratio becomes low or small.

During the transmission of force, although the torque converter 12 may take a state wherein it effects the torque multiplication or a state where it serves as a fluid coupling depending upon operation conditions, since the torque converter 12 is provided with the lock-up clutch 10 attached to the turbine runner 6, the engine output shaft 2 can be mechanically and directly coupled with the drive shaft 22 by discharging the oil from the lock-up clutch oil chamber 14, allowing the lock-up clutch 10 to be pressed against the converter shell 4a integral with the pump impeller 4.

Hereinafter, an explanation is made along FIG. 4 which illustrates in detail the drive pulley 24.

As previously described, the drive shaft 22 splined to the turbine runner 6 of the torque converter 12 is rotatably supported by the case 20 by means of the bearings 16 and 18. (To be exact, the bearing 16 is a bushing press fit in a front cover 20 integrally secured to the case 20 by means of bolts 84, while, the bearing 18 is attached to an oil pump housing 81 integrally secured to the case 20 by means of bolts 85). The drive pulley 24 comprises the fixed conical disc 26 integral with the drive shaft 22 and movable conical disc 30 which is arranged in a face-to-face relationship with the fixed conical disc to define a V-shaped pulley groove and is axially slidable along the driven shaft 22 by means of slidable bearing 86.

A generally conical partition wall member 23 is mounted in an axially fixed manner on the driven shaft 22 for rotation therewith, the outer peripheral portion of the partition wall member 23 is sealably fitted within a cylinder wall 30a integral with the movable conical disc 30, thus defining the drive pulley cylinder chamber 28. A sealing member 87 is mounted on the outer periphery of the partition wall member 23, thus sealing the drive pulley cylinder chamber 28. Fixedly attached to the open edge of the cylinder wall 30a is an oil trough 31 including an annular disc like portion 31a directed inwardly of the cylinder wall 30a and a tubular portion 31b directed axially from the disc like portion 31a as shown in FIG. 4. The cylinder wall 30a, partition wall member 23 and trough 31 cooperate with each other to define or enclose a compensation chamber 29. As shown in FIG. 4, the cylinder chamber 28 is separated from the compensation chamber 29.

Formed on the outer periphery of the spindle portion 23a of the partition wall member 23 are a peripherial groove 23b and a through hole 23c. Sealing rings 88 and 89 are mounted on the both sides of the peripheral groove 23b. An oil passage 90 which is open to the peripheral groove 23b is formed in the front cover 21. The oil passage 90 receives regulated fluid pressure from a shift control valve 100. The oil pressure is thereafter supplied to the drive pulley cylinder chamber 28 via the peripheral groove 23b and hole 23c to act on the movable disc 30, thus displacing same for axial movement. A thrust bearing 91 is disposed on the front cover 21 for axial support of the drive shaft 22 and the partition wall member 23. This thrust bearing 91 and the previously mentioned bearing (bushing) 16 are exposed to the oil, coming from the torque converter outlet, passing through an oil conduit formed between the drive shaft 22 and front cover 21 so that they are subject to lubrication with the oil discharged from the torque converter 12 and a portion of the oil having past lubricating parts is discharged outwardly of the front cover 21 through a passage or hole 92 formed through the front cover 21. Although, in the drawing, only one such passage or hole is illustrated, the number is not limited to one. The passage 92 may be in the form of an outlet of a well known relief valve of the torque converter which permits the oil flow while maintaining the pressure within the torque converter 12.

Hereinafter, the centrifugal force compensation function is explained. The movable conical disc 30 is displaced for axial movement in response to the magnitude of the oil pressure in the drive pulley cylinder chamber 28, thus varying the running diameter of the V-belt 32, thus effecting continuous shift. The supply of oil to the pulley cylinder chamber 28 from the shift control valve 100 is effected via oil conduit 90, annular groove 23b and hole 23c.

The supply of oil to the compensation chamber from the outlet of the torque converter 12 is effected via the passage 92. The oil having leaked through sealing ring 89 is also supplied to the compensation chamber 29. The oil disposed in the compensation chamber 29 is displaced radially outwardly by the action of the centrifugal force. Thus, the compensation chamber 29 is filled with the oil.

The tubular portion 31b of the trough 31 is sufficiently long enough to receive the oil from the passage 92 over the whole range of axial movement of the movable conical disc 30. If the drive pulley 24 rotates at high speeds, the oil pressure within the drive pulley cylinder chamber 28 increases accordingly under the influence of the centrifugal force. However, since there exists oil within the compensation chamber 29, the same centrifugal force acts within the compensation chamber 29 to develop the oil pressure therein. The oil pressure within the drive pulley cylinder chamber 28 and that within the compensation chamber 29 due to the centrifugal force are substantially equal to each other because rotational radius and the rotational speed of the both chambers are equal, and these oil pressures act in the opposed directions to each other because the chambers are arranged on the opposite sides of the fixed wall member 23. Accordingly, the oil pressures due to the centrifugal force acting within the both chambers are offset. The volume of oil within the compensation chamber 29 is limited by the dimension of the disc like portion 31a.

The centrifugal force compensation apparatus thus far described may be provided to one or both of the pulleys, and if the apparatus is applied to the drive pulley only, the following advantage is obtained. Since the oil pressure due to the centrifugal force has no influence upon the movement of the drive pulley, the oil pressure within the drive pulley cylinder chamber may be decreased in a desired manner to provide a quick and swift shift in the case wherein the reduction ratio is desired to be increased during running of the vehicle at high speeds. Besides, since the centrifugal force acting upon the driven pulley causes an increase in the oil pressure in the driven pulley cylinder chamber and in the transmission capacity of the driven pulley, the occurrence of slip of the V-belt is effectively prevented.

What is claimed is:

1. A continuously variable V-belt transmission comprising;
   a drive pulley;
   a driven pulley;
   a V-belt running over said drive pulley, each of said pulleys having an axially fixed conical disc, an axially movable conical disc provided with
   a cylinder wall, an axially fixed partition wall sealably fitted within said cylinder wall to define within said cylinder wall a cylinder chamber between said axially fixed partition wall and said axially movable conical disc, and a trough including an annular disc like portion extending inwardly from said cylinder wall to define within said cylinder wall a compensation chamber between said disc like portion of said trough and said axially fixed partition wall;
   said trough including a tubular portion extending axially from said disc like portion in a direction remote from said axially fixed partition wall;
   said axially fixed partition wall carrying means sealably separating said compensation chamber from said cylinder chamber so as to prevent communication therebetween;
   a shift control valve;
   means establishing communication between said cylinder chamber and said shift control valve;
   a source of lubricating fluid; and
   means defining at least one passage establishing communication between said source of lubricating fluid and said compensation chamber, said at least one passage being so oriented as to direct a flow of fluid thrown radially outwardly toward said tubular portion of said trough toward said compensation chamber.

2. A continuously variable V-belt transmission as claimed in claim 1, further comprising:
   a drive shaft with which said axially fixed conical disc of said drive pulley and said axially movable conical disc thereof are rotatable, said axially movable conical disc of said drive pulley being integral with said cylinder wall of said drive pulley;
   said axially fixed partition wall being connected in axially slidable manner to said cylinder wall integral with said axially movable conical disc of said drive pulley and connected in axially fixed manner to said drive shaft; and
   a sealing member disposed between said axially fixed partition wall and said cylinder wall;
   said sealing member, said cylinder wall integral with said axially movable conical disc of said drive pulley, said axially fixed partition wall and said axially movable conical disc of said drive pulley cooperating with each other to define said cylinder chamber.

3. A continuously variable V-belt transmission comprising:
   a drive shaft;
   a driven shaft;
   a drive pulley mounted to said drive shaft;
   a driven pulley mounted to said driven shaft;
   a V-belt running over said drive and driven pulleys;
   each of said pulleys having an axially fixed conical disc, an axially movable conical disc provided with a cylinder wall, an axially fixed partition wall member sealably fitted within said cylinder wall to define within said cylinder wall a cylinder chamber between said axially fixed partition wall and said axially movable conical disc, and a trough including an annular disc like portion extending inwardly from said cylinder wall to define within said cylinder wall a compensation chamber between said disc like portion of said trough and said axially fixed partition wall;

said trough including an axially extending tubular portion having one end connected to said disc like portion and an opposite end opening to the ambient atmosphere;

said axially fixed partition wall member carrying means sealably separating said compensation chamber from said cylinder chamber so as to prevent communication therebetween;

a shift control valve;

means establishing communication between said cylinder chamber and said shift control valve; and means, including at least one passage, for conducting a fluid to said compensation chamber, said at least one passage being so oriented as to direct a flow of fluid thrown radially outward toward said tubular portion of said trough toward said compensation chamber.

4. A continuously variable V-belt transmission comprising;

a drive pulley;

a driven pulley;

a V-belt running over said drive pulley, each of said pulleys having an axially fixed conical disc, an axially movable conical disc provided with a cylinder wall, only said drive pulley including an axially fixed partition wall sealably fitted within said cylinder wall to define within said cylinder wall a cylinder chamber between said axially fixed partition wall and said axially movable conical disc, and a trough including an annular disc like portion extending inwardly from said cylinder wall to define within said cylinder wall a compensation chamber between said disc like portion of said trough and said axially fixed partition wall;

said trough including a tubular portion extending axially from said disc like portion in a direction remote from said axially fixed partition wall;

said axially fixed partition wall carrying means sealably separating said compensation chamber from said cylinder chamber so as to prevent communication therebetween;

a shift control valve;

means establishing communication between said cylinder chamber and said shift control valve;

a source of lubricating fluid; and means defining at least one passage establishing communication between said source of lubricating fluid and said compensation chamber, said at least one passage being so oriented as to direct a flow of fluid thrown radially outwardly toward said tubular portion of said trough toward said compensation chamber.

* * * * *